United States Patent [19]

Rowley et al.

[11] Patent Number: 5,028,191

[45] Date of Patent: Jul. 2, 1991

[54] SELF-LOCKING THREADED MEMBER AND METHOD

[75] Inventors: Terry J. Rowley, Fairfield, Ohio; James Bowman, Duncanville, Tex.

[73] Assignee: Long-Lok Fasteners Corporation, Dallas, Tex.

[21] Appl. No.: 660,068

[22] Filed: Oct. 12, 1984

[51] Int. Cl.$^5$ .............................................. F16B 39/04
[52] U.S. Cl. .................................................. 411/292
[58] Field of Search ............... 411/292, 293, 417, 418, 411/437, 301, 302, 303, 304, 305, 306, 512, 513, 947, 948, 82; 10/10 P

[56] References Cited

U.S. PATENT DOCUMENTS

| | | | |
|---|---|---|---|
| Re. 23,878 | 9/1954 | Burdick | 411/304 |
| 833,409 | 10/1906 | McGuire | 411/292 |
| 929,084 | 7/1909 | George | 411/292 |
| 961,249 | 6/1910 | Meeker | 411/947 X |
| 1,121,156 | 12/1914 | Aubrey | 411/293 |
| 2,377,186 | 5/1945 | Saleh | 411/293 |
| 2,457,945 | 1/1949 | Soden | 411/303 |
| 3,232,160 | 2/1966 | Fork et al. | 24/453 X |
| 3,908,727 | 9/1975 | Osborne | 411/304 |

FOREIGN PATENT DOCUMENTS

| | | | |
|---|---|---|---|
| 822639 | 11/1951 | Fed. Rep. of Germany | 411/292 |
| 2011291 | 9/1971 | Fed. Rep. of Germany | 411/304 |
| 969217 | 5/1950 | France | 411/292 |
| 312101 | 5/1929 | United Kingdom | 411/301 |
| 504853 | 5/1939 | United Kingdom | 411/304 |
| 860124 | 2/1961 | United Kingdom | 411/513 |
| 1040083 | 8/1966 | United Kingdom | 411/304 |

Primary Examiner—Rodney M. Lindsey
Attorney, Agent, or Firm—Beehler & Pavitt

[57] ABSTRACT

A self-locking threaded member which may be internally or externally threaded at least along a portion of its surface includes an aperture provided longitudinally along the axis of the member but spaced radially from the center thereof. The aperture is preferably located such that a portion thereof passes through adjacent flanks of the threads and includes a portion which is radially positioned to pass through the base of the valleys. The aperture receives a locking member in the form of a pin which extends axially of the fastener and is of a length to extend across at least two adjacent crests and is preferably spaced from the lead threads. The locking member operates as a wedge to cause an increase in the friction between the mating threads opposite the position of the locking element. Various forms of locking elements may be used, such as plastic or metal. Various configurations are disclosed as well as a relatively simple method to make the fastener.

26 Claims, 3 Drawing Sheets

SELF-LOCKING THREADED MEMBER AND METHOD

FIELD OF INVENTION

This invention relates to self-locking threaded members and more particularly to an improved fully contained, thread locking assembly capable of high temperature use, and which may be reused and which may be easily refurbished.

DESCRIPTION OF THE PRIOR ART

Self-locking fasteners are well known in the prior art and may be of various types. In one form, self-locking is achieved by a single area thread dilation created by a solid metal ball being pressed into an axially drilled hole, the latter being precisely located with respect to the minor diameter of the thread. In another form, self-locking is achieved by three equally spaced dilated external threads created when a specially designed swaging tool is press fitted into a controlled diameter cavity machined in the end of an externally threaded fastener. Another prior art approach has been to use single or multiple coiled pins press fitted into slots of predetermined dimensions milled longitudinally in an externally threaded fastener. In still another form of the prior art, the threads are deformed to provide a locking device by crimping or otherwise deforming the thread shape.

The prior art has also utilized the configurations described in MIL-F-18240 as Configuration A and Configuration B. For a further description of these configurations, reference is made to U.S. patent application Ser. No. 629,200 filed Jul. 9, 1984 and assigned to the same assignee as this application. In addition to the above, there are a number of patents which deal with pellet, strip and patch type self-locking fasteners in which the locking element is a plastic member of any of a number of different plastics, such as, nylon 6, nylon 66, PET, and a wide variety of other plastic materials mentioned in prior patents.

As mentioned in the above identified application, Ser. No. 629,200, a polyimide plastic available under the trademark "VESPEL" has also been used with limited success in an attempt to provide a self-locking fastener. The above identified application describes an improved fastener structure and method of fabricating the same using a polyimide, such as VESPEL, the latter offering the advantage of high temperature performance, e.g., as high as 550 degrees C.

It is also apparent from the prior art that not all techniques are equally suitable for forming a self-locking device in both internally threaded and externally threaded members. Thus, for example, the nature of the locking device and/or the method of fabrication may be such that the technique is useable only with externally threaded fasteners. Further, the prior art approaches and fabrication techniques may not be useable with thin walled structures such as threaded pipes, flanges, couplings and the like.

The structures and approaches of the prior art also suffer from several disadvantages which limit the application or use of these prior devices. For example, if reuse is a significant factor then the use of dilated threads as a locking device, tends to produce wear due to frictional contact on the dilated threads, causing a drop in the prevailing torque during reuse. Except for the crimped thread approach, many of the prior art designs can only be used effectively with externally threaded parts. In the case of metal ball formed or swaged type of fasteners, the fasteners cannot be reworked economically or effectively. Coiled pins in milled slots tend to collapse upon installation resulting in low or minimal prevailing torque during reuse cycles. Containment of the coiled pins is marginal. Slot dimensions must be carefully held and often the coiled pins vary in diameter resulting in variations in torque and in insert containment, i.e., it is difficult to retain the coiled pins or to retain them in the proper location. In the case of the multiple slot or insert type of design, there is the obvious problem of increased cost of manufacture and further, the need to deburr each milled slot and the possibility of damage to the surface finish or to the surface of the threaded member during the slotting and/or deburring operations.

It becomes apparent from the above discussion that a need exists for a relatively simple, but effective self-locking assembly which is useable with internally and externally threaded members and one which is comparatively inexpensive, as well as one which offers several different options with respect to the member which cooperates to provide the self-locking feature.

It is also advantageous to provide a threaded self-locking member which permits the use of a variety of locking members such as metals, for high temperature use, and various plastic materials and composite materials as may be needed to obtain the proper torque or because of the environment in which the threaded member is used.

A need also exists for a relatively simple method to fabricate a self-locking threaded member and which is easy to control, in order to provide products of a specific design and wherein each of the finished products of a given design has the same prevailing torque quality, while reducing or eliminating the need for secondary operations such as deburring and the like.

It is also desirable to provide a threaded self-locking member in which the locking member is positively held in the threaded member and in the proper predetermined position and which may be easily reworked economically and effectively in order to replace the locking element, if needed.

BRIEF DESCRIPTION OF THE INVENTION

In accordance with this invention, an improved and highly effective threaded self-locking member is provided which may be in the form of virtually any internally or externally threaded member intended to be assembled in a self-locking mode to a complimentary threaded member, as well as a relatively simple method by which the same may be fabricated reasonably inexpensively to provide self-locking members having essentially the same torque qualities from one part to the next.

In substance, the self-locking threaded member of this invention may be any internally or externally threaded member such as a fastener element of the various types known in the art, a nut of the various types known, threaded pipe (internally or externally threaded) and virtually any threaded member which is to be assembled to a complimentary threaded member. The threaded member includes the usual helical thread formed by crests, thread flanks and valleys between adjacent crests. The threaded member includes an aperture provided generally longitudinally of the threaded member, in the threads and so located that the aperture extends longitudinally along the threads and is spaced radially from the center axis of the threaded member. As used herein, "longitudinally" refers to the general axial orientation of the aperture with respect to the threaded member, as will be described.

The aperture, which may be of various cross-sectional shapes, is provided in such a fashion that the aperture passes through the flanks of adjacent threads and includes a portion which extends through the valley between adjacent thread flanks. The aperture may be provided starting at either end of the threaded member, depending upon the type of threaded member. In the case of nuts, for example, the aperture may extend from one face to the other, or only partly through the body. In the case of bolts, the aperture may extend from the end with the lead thread or the opposite end and may be completely or partly through the length of the fastener.

Received within the aperture is a locking member which may be of various materials and combinations of materials, and so located in the aperture as to extend along the longitudinal axis of the member, but spaced radially of the center axis thereof. While it is preferred that the aperture be spaced a uniform distance from the center axis of the threaded member for ease of manufacture and quality control, various orientations of the aperture may be used as will be apparent form the detailed description. The locking member preferably has a predetermined length sufficient to extend across at least two adjacent crests and may be spaced axially from the starting end of the threaded member so that the member may be easily assembled to a mating part before the locking member is engaged by the mating threads.

The self-locking action is the result of increased frictional contact between the mating threads at a location 180 degrees from the position of the locking device. Since a portion of the locking device extends radially of the valley and is located between the flanks of adjacent crests, a portion of the locking device is engaged by the threads of the mating part causing an increased friction in the mating threads opposite the location of the locking member.

Thus, the term "self-locking" is intended to encompass those structures in which a locking member is present and which locks, as described, during assembly to a mating member, or which may be activated during assembly of the mating parts. "Self-locking" as used herein refers to the fact that locking is achieved by frictional contact between the mating threads of the mating member.

By proportioning the diameter of the locking member properly with respect to the diameter of the aperture into which it is received, and using a locking member of a predetermined length usually less than the length of the aperture, the locking member may be properly assembled into the aperture in any one or more of a different number of ways and may be properly located along the axis of the threaded member in such a manner that there are free threads for easy start and self-locking action for several threads along the length of the threaded mating parts. As is apparent, the greater the number of threads engaged, the greater the prevailing torque, all other factors being equal. Thus, as a general rule, the prevailing torque may be increased by merely increasing the length of the locking member, although the same result may be achieved differently, as will be described.

Since the aperture may be formed by any one of a different number of operations and through at least one end face of the threaded member, burrs in the part may be reduced depending upon the method used to form the aperture. One of the advantages of this invention is that it is not limited to a particular type of operation in the formation of the aperture. Further, it is a relatively easy chore to replace the locking member merely by removing the old member, as by drilling for example, and replacing it with a new member, if that is desired. The self-locking member of this invention is capable of substantial reuse, and provides the prevailing torque qualities as set forth in MIL-F-8961.

As will be apparent from the detailed description, various locking members may be used, depending upon the desired prevailing torque needed and the conditions of service. Thus, for example, the use of metal members as the locking member provides a self-locking member which may be used effectively after having been heat conditioned at 900 degrees F.

Fabrication of the self-locking member in accordance with this invention is relatively simple. An aperture of a predetermined cross-section is formed in the threaded member in the location described. Various methods may be used to form the aperture which may be of a variety of cross-sectional shapes. A locking member is provided in the aperture and, if it is a preformed locking member, it is located at the proper position along the axis of the threaded member. Locking members of various materials and geometries may be used and the locking member may be retained in position in the aperture by various relatively simple and effective techniques. The details of the fabrication and the various types of locking members will be described in detail.

As will be apparent from this brief description, many of the desirable features discussed have been achieved. It will also be apparent that the above advantages of this invention, and many others, are made more clearly apparent from a consideration of the several forms in which it may be embodied. Such forms are shown in the drawings accompanying and forming a part of the present specification. These forms will be described in detail for the purpose of illustrating the general principles of the invention; but it is to be understood that such detailed description is not to be taken in a limiting sense.

DETAILED DESCRIPTION OF THE INVENTION

Figures 1, 1A, 2, 3, 4:
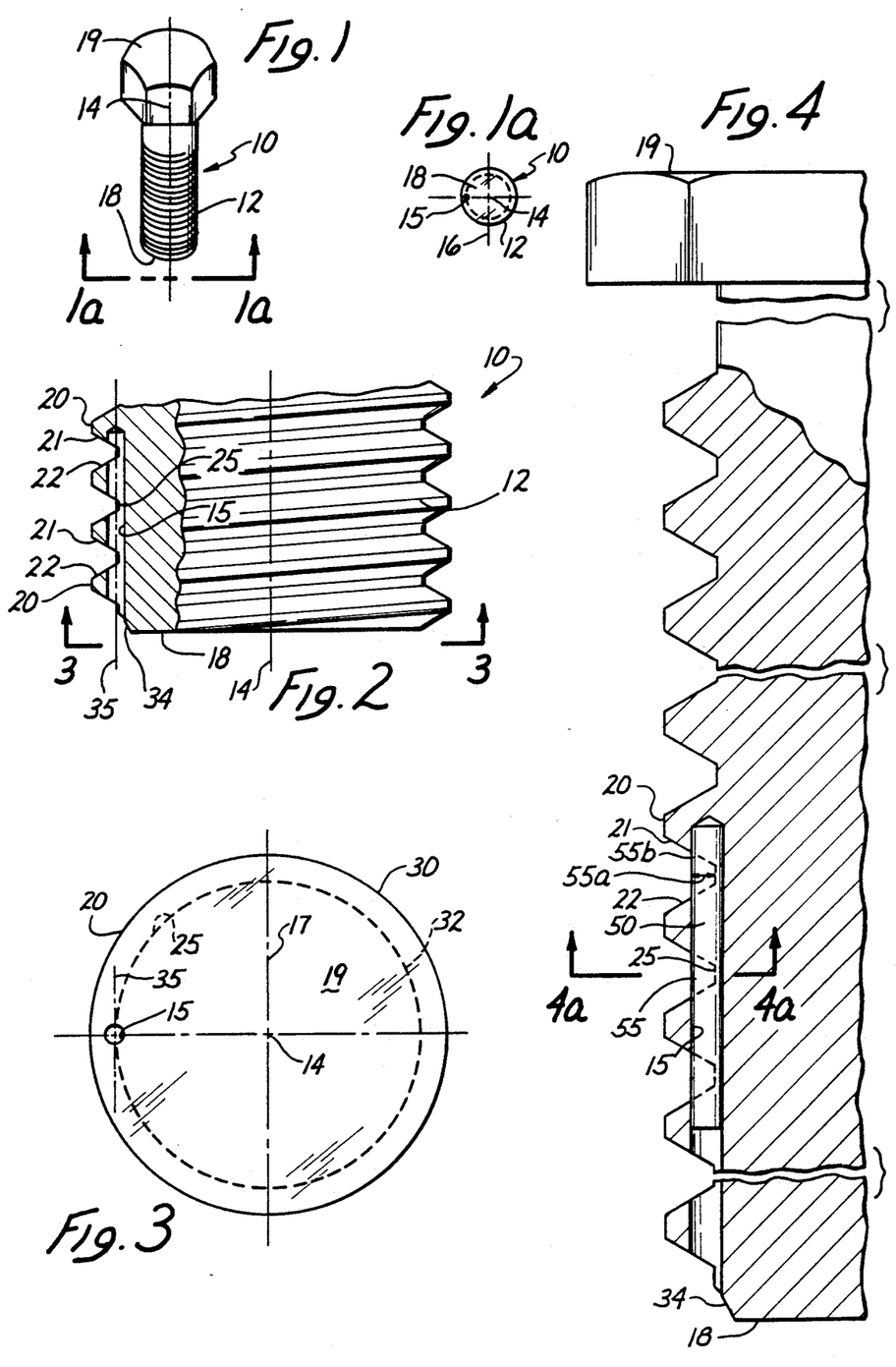
FIG. 1 is a view in perspective of a threaded self-locking member, in the form of an externally threaded fastener, in accordance with this invention.
FIG. 1a is an end view taken along the line a—a of FIG. 1.
FIG. 2 is an enlarged fragmentary view, partly in section and partly in elevation, illustrating the relation between the aperture and the threaded member in accordance with this invention.
FIG. 3 is an end view taken along the line 3—3 of FIG. 2.
FIG. 4 is an enlarged diagrammatic view, partly in section and partly in elevation, illustrating the relation between the locking member, the aperture and the axial location of the locking member in accordance with this invention.

Referring to the drawings which illustrate forms of the preferred embodiment of this invention, FIGS. 1 and 1a illustrate a self-locking member 10 in the form of an externally threaded fastener 12, which may be of any of the types of externally threaded fasteners known in the art. In the form illustrated, the fastener 12 is a hexagonal headed threaded bolt, although the invention is not limited thereto. The member 12 includes a center longitudinal axis 14 and is provided with an aperture 15 (FIG. 1a), located off the center line 16 and in the end face 19 of the member. The aperture 15 is spaced radially outwardly of the axis 14 and of the axis 16 of the end face 19 and extends towards the other end of the member 12 a predetermined distance.

If desired, the aperture may be formed through the end face 19 of the member 10. This may be advantageous in those instances in which the threaded lead end has a slight taper as illustrated in FIG. 2, for example.

Referring to FIGS. 2 and 3, at least a portion of the exterior surface of the member 12 is threaded, the threads including crests 20 with adjacent flanks 21 and 22 with a valley or base 25 between adjacent crests and at the intersection of facing flanks, as shown. The major diameter 30 of the member 12 is the diameter of the crests 20 while the diameter at the valleys 25 is the root diameter 32. In externally threaded members the major diameter is larger than the root diameter, as shown, the root diameter sometimes being referred to as the minor diameter. Since most externally threaded fastener members are usually threaded completely along their length, the end face 19 may not be planar but may include a tapered periphery 34 formed by the threading operation, i.e. a part of the lead thread. The aperture 15 is formed in the end face, but due to the location thereof it may well be on a portion of the tapered periphery 34. The aperture 15 may also be in the other end face 19, as described.

As illustrated in FIGS. 2 and 3, the aperture 15 is displaced radially outwardly of the longitudinal axis 14 of the member 12 and extends generally axially for a predetermined distance from the end face. Depending upon the length of member 12, the aperture may extend the full length of the threaded portion of the member or partly along the length thereof. In any event, the length of the aperture is sufficient to extend at least across two to three crests and preferably long enough to provide some lead threads before the locking member is reached by the mating threads. Where the aperture is formed through the end face 19, it may likewise extend the full length of the threads or may terminate short of the lead end in order to provide lead threads.

The aperture may be of any of a number of cross-sectional shapes and may be formed by any of a number of different operations. Thus, for example, it may be round in cross-section and formed by the usual metal forming operations such as drilling or the like. Such as aperture may also be formed by laser or and EDM operations. EDM offers the advantage that the cross-sectional shape of the aperture is a function of the cross-sectional shape of the EDM tool and such tools are capable of a wide variety of shapes. For example, round, square, triangular, oval, polygonal, rectangular, and the like, are relatively easily provided by EDM operations. For purposes of explanation of this invention, however, reference is made to generally circular apertures, although the invention is not limited thereto.

In one form, the center 35 of the aperture 15 may be preferably located radially inwardly of the crests and radially outwardly of the root, the aperture being of such a dimension (diameter) that a portion thereof passes through the flank walls 21 and 22 and a portion is radially inwardly of the valleys or base 25. It is to be understood, however, that the center line of the aperture may be on the root diameter or a small distance radially inwardly or outwardly of the root diameter depending upon the particular dimensions of the crests and valleys and the dimensions of the member 12 and the (dimension) diameter of the aperture. Another consideration is the desired torque. It is apparent, however, that if the center line of the aperture 15 is radially outwardly of the root diameter this provides a greater amount of locking member in the valleys between adjacent crests, for a given set of aperture and locking member dimensions, as will be described.

Referring to FIG. 4, enlarged for purposes of explanation and not drawn to scale, effective locking is achieved by positioning the locking element 50 in the aperture with the dimensions and cross-sectional shape of the aperture and the locking element being coordinated and correlated with the radial position of the aperture such that there is enough of the locking element segments 55 located in the valleys 25 between adjacent flanks 21 and 22 to engage the crests of the mating part to effect the wedging action opposite to the locking element to increase the friction between the mating threads opposite the location of the locking element 50. As will be apparent, there are several possible variations depending upon the geometry of the member 12 and its crest and root dimensions and the material of which the locking element is made.

The locking element may be made of any of a number of different materials and combinations of materials and elements. Typical such materials may be metal, plastic, filled plastics, to mention only a few. Virtually any material, or combinations of materials, capable of producing the desired wedging action under the conditions of use may be employed. For example, if the locking element is a solid metal rod-like member which is not easily compressed, the radial dimension of the locking segments 55, i.e., the dimension 55a of the segments from the valley 25 to the exposed outer surface 55b of the segments may be smaller than may be needed in a case where the locking member is plastic, for example. Further, where composite members or materials are used, as will be described, the length and radial dimension and the location of the locking member may vary from one type of locking member to the next based solely on material considerations. Alternatively, where the possibility of thread damage to the mating part is of concern, the dimensions (for example, the diameter) of the aperture 15 and that of the locking member 50 may be reduced, but the length of the locking member may be increased to engage a larger number of mating threads. The variations that are possible because of this invention is one of the principal advantages of the present invention.

Referring again to FIG. 4, the aperture is illustrated as circular in cross-section and of a predetermined diameter, located radially with respect to the center axis, as described. The aperture extends axially a predetermined dimension from the face 19 of the threaded member and is of a length sufficient to provide a lead section free of locking and a locking section which covers at least two to three crests, although the length may be longer if desired. Further, the length of the locking member 50 is such as to extend axially across two to three crests, although it too may be longer if desired. One of the advantages of this invention is that the locking element may be positioned anywhere along the longitudinal axis of the member 12 since the locking action is controlled principally by the length of the locking element and its diameter relative to the crest dimensions and the amount of locking material in the valleys between adjacent crests. The location of the locking element may be varied by varying the length of the aperture, since the locking element is usually positioned to bottom out in the aperture.

In one form of the invention, the dimension and shape (for example diameter) of the aperture and the dimension and shape (diameter) of the locking member are coordinated such that there is a tight fit between the two, i.e., a sufficiently tight fit such that the locking element is not free to fall out of the member to which it is assembled. To achieve retention of the locking member, standard press fit tolerances between the locking member and the aperture may be used. Other arrangements, however, may also be used. For example, with small diameter members, the aperture may be quite small due to the crest dimensions. In such a case, the locking element may not have sufficient strength to be forced into the aperture, i.e., the locking member may be of a dimension similar to small gage wire. In this case, one may use a smaller diameter wire, one which might fall out of the aperture, and secure it in place with an adhesive placed in the aperture after insertion of the locking element. The locking member may be retained by adhesive or any number of other arrangements such as tight plugs, and the like. In any case, once engaged by the mating threads, the locking element is not free to move axially.

One of the practical advantages of the present invention is that the circumferential dimension of the locking element is automatically and closely controlled. Thus, in the case of patch type fasteners, care must be exercised during application of the patch to control circumferential flow of the patch material during application. If there is too much circumferential flow, torque values may be adversely affected. By the present invention, the circumferential configuration of the locking element may be essentially fixed and uniform.

Figures 4A, 5, 7:
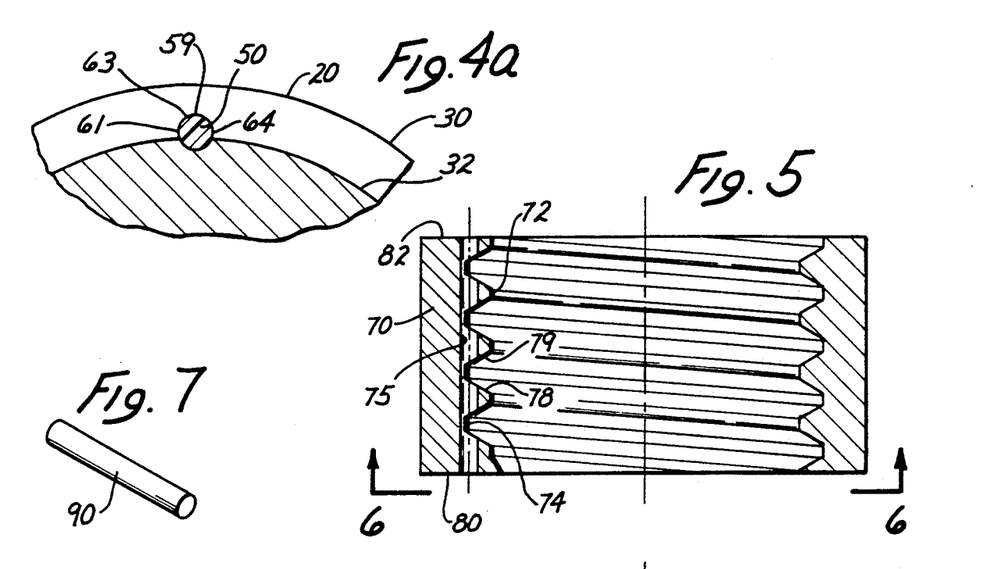
FIG. 4a is a view, partly in section and partly in elevation, taken along the line a—a of FIG. 4.
FIG. 5 is an enlarged fragmentary view, partly in section and partly in elevation, of an internally threaded self-locking member in accordance with this invention in which the member is in the form of an internally threaded nut.
FIG. 7 is a view in perspective of one form of locking member in accordance with this invention.

Referring to FIG. 4a, the outer circumferential contour 63 of the locking element is fixed by the geometry of the outer surface of the locking element. Thus, there is a uniform and predictable increase from a minimum exposure 61 to a maximum exposure at the apex 59 to a minimum at 64 the changes being symmetrical and fixed. These same conditions may be achieved to a greater or lesser degree by various locking element and aperture configurations, depending on the particular threaded member and the conditions of use. As mentioned, the nature of the material or materials of the locking member is also a consideration. For reasons of economy, ease of fabrication, quality control and control of torque from one part to the next, it is preferred that relatively uncomplicated geometries be used, typically a round locking element in a round aperture. It should be noted, however, that there are circumstances in which the determination of simplicity of geometry may involve more than merely geometrical considerations. Material considerations may suggest the use of what might initially appear to be more complex geometries, for example, a round aperture and a square locking element of VESPEL, for example. In terms of overall performance and the problems solved and the advantages achieved, seemingly complex geometries are in fact uncomplicated for the particular application and for the purposes of this invention.

Figures 6, 8, 9, 10, 11, 12:
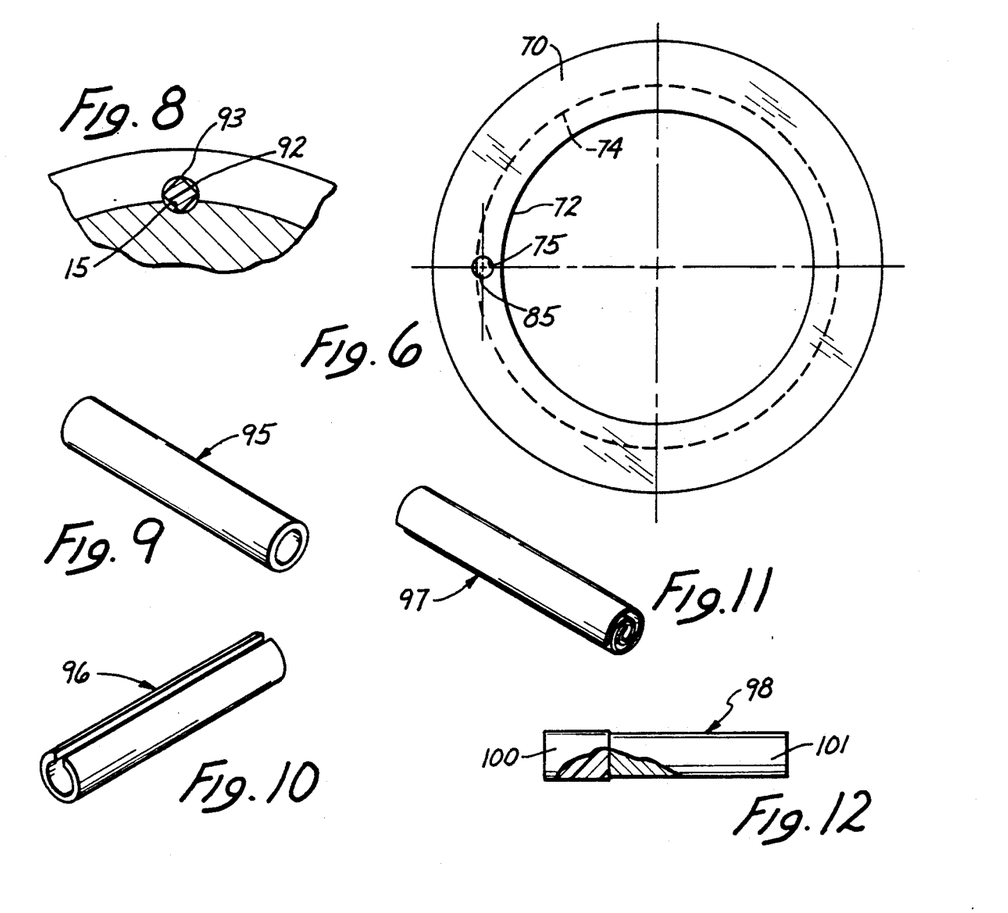
FIG. 6 is an end view taken along the line 6—6 of FIG. 5.
FIG. 8 is a diagrammatic view of another form of locking member according to this invention and its orientation with respect to the crest and valley of a threaded member.
FIG. 9 is a view in perspective of another form of locking member in accordance with this invention.
FIG. 10 is a view in perspective of yet another form of locking member in accordance with this invention.
FIG. 11 is a view in perspective of still another form of locking member in accordance with this invention.
FIG. 12 is a view, partly in section and partly in elevation, of a composite locking element in accordance with this invention.

One of the features of the present invention is that the locking member may be used with internally threaded parts, Referring to FIGS. 5 and 6, an internally threaded nut 70 is shown. Here, however, the crests 72 have a diameter less than the valleys 74, the crest diameter sometimes being referred to as the minor diameter. An aperture 75 is provided, but in this case the center of the aperture is located radially inwardly of the valleys 74 so that the aperture passes through the flanks 78, 79 of adjacent crests. The variations and other modifications already discussed become apparent in their application to this type of threaded member.

In this form, the aperture extends from one face 80 to the other 82 and receives a locking element 85, as already described. In the case of a nut, the diameter of the locking member should be such that it is tightly held, as already described. Again, when assembled to a mating member, the locking element is held in place, as already noted. In operation, the locking element again functions in the manner described and with the advantages already noted and is capable of the various modifications already noted.

The locking member may be a simple solid cylindrical rod 90 as shown in FIG. 7. It may be fabricated to the proper length and of the proper diameter or configuration from any number of different materials already mentioned. While generally the preferred shape is cylindrical, other cross-sectional shapes may be used.

In FIG. 8, a locking element 92 is shown which is square in cross-section and oriented in the aperture 15 such that one corner 93 is located for maximum exposure. It is understood that the dimension of the square is chosen to effect a tight fit in the aperture in order to minimize rolling of the locking element during assembly to a mating member. Such a locking member of a polyimide, such as VESPEL, offers the advantage of high temperature use. If desired, one may use an adhesive to fill the arcuate voids along the length of the locking element. Where materials other than VESPEL are used, the element may be further secured either through the use of a plug or by adhesive or any other suitable means.

Due to the variety of materials which may be used, the present invention permits fabrication of threaded self-locking members capable of use in high temperature environments such as jet engines or high temperature exhaust systems. The self-locking member in the form of a fastener may have as many as fifteen or more reuses. Repair of the product of this invention is relatively simple since the fabrication thereof is relatively simple.

In substance, the fabrication involves forming an aperture in the location described and assembling to the member a locking element, configured as described. Since the aperture is capable of being formed by any one of the procedures already described, an appropriate and known method may be used to reduce or substantially eliminate burrs, for example EDM or drilling operations. Further, there is no damage to the threads or to any surface treatment of the threaded member. Replacement of the locking element is relatively simple and amounts to removing the old member and inserting a new member.

It is also possible to form a locking element in situ by providing a dummy mating part have a thread configuration which provides appropriate spaces between the crests of the dummy part and the valleys of the threaded member. The threaded surface of the dummy part may be treated with a release agent for the material of the locking element and the material of the locking element, be it plastic, filled plastic or molten or fluid metal is introduced through the open end of the aperture, and allowed to harden or solidify. The dummy mating member, which may be in the form of a split mold is separated after solidification and the finished part is ready for use. By using threads in the dummy part which match the threads of the threaded part in the regions other than where the locking element is to be located, one is able to control the locking element location in the finished part. In this way, side flanks of the threads of the threaded member act to lock the locking element, especially if the threads of the dummy part are selected such that the crests thereof are spaced a small distance from the intersection of the aperture with the flanks.

In addition to the locking elements already described, various other members may be used. Referring to FIG. 9, the locking element may be in the form of a hollow tube 95 of metal or plastic and of the appropriate length and diameter. In this case the torque is a function of the wall thickness of the tube. Another form is shown in FIG. 10 in which the locking element is in the form of a split metallic cylinder 96, more commonly known as an expansion pin.

FIG. 11 illustrates a locking element in the form of a spring pin 97 in the form of a coiled spring of 1070 carbon steel, for example. FIG. 12 shows a composite pin 94 made of different materials such as a plastic end 100 of a diameter slightly larger than the end 101. The end 101 may be of the same or different material, e.g., plastic or metal. End 100 may be used as a lock to hold end 101 in the desired location in the threaded member.

Figure 13:
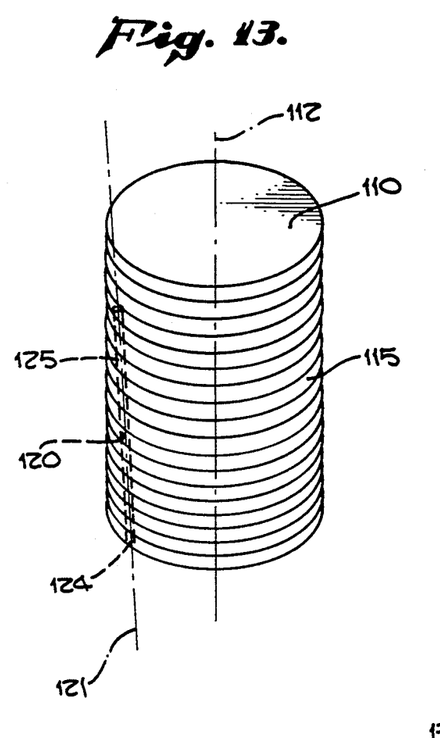
FIG. 13 is a diagrammatic view, for purpose of explanation, illustrating a self-locking member in which the locking member is oriented in a non-parallel relation with the center axis of the threaded member.

As previously mentioned, the orientation of the aperture and thus the locking member need not be spaced the same radial distance from the center axis of the threaded member. Referring to FIG. 13, a threaded member 110 is shown having a center axis 112 and external threads 115, for example, although it is recognized that the member 110 may be internally threaded. The member 110 includes an aperture 120 which is at an angular orientation with respect to the axis 112 of the member, that is, the axis 121 of the aperture is non-parallel with respect to the axis 112. In this form, the end 124 of the aperture adjacent the lead end preferably does not pass through the thread flanks of the first few lead threads in order to provide non-locking on the lead threads, as shown. The aperture may extend the full length of the fastener but preferably does not. In this form, the outer surface of the locking element 125 extends radially outwardly a distance which progressively increases along the length of the member 110.

Figure 14:
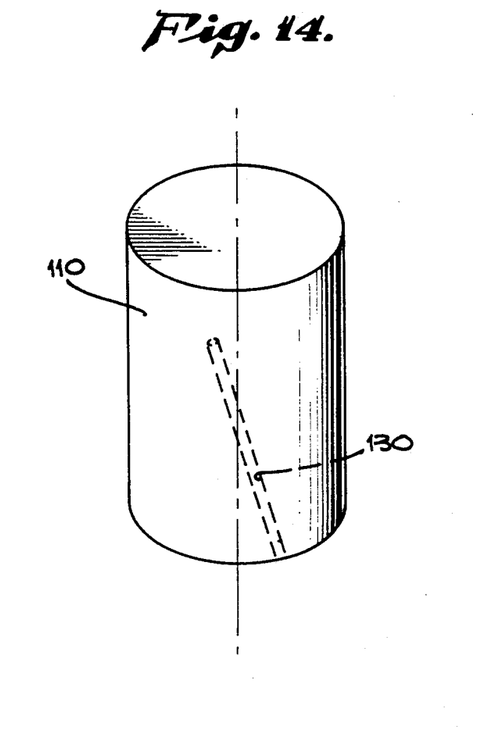
FIG. 14 is another diagrammatic view illustrating an arrangement in which the locking member is offset and arranged diagonally with respect to the axis of the threaded member.

As illustrated in FIG. 14, the aperture 130 may be oriented at an angular relation with respect to the long axis of the member 110, i.e., the aperture is in effect canted, as shown. It is to be understood that the aperture may be displaced radially and canted, if desired.

Figures 15, 16:
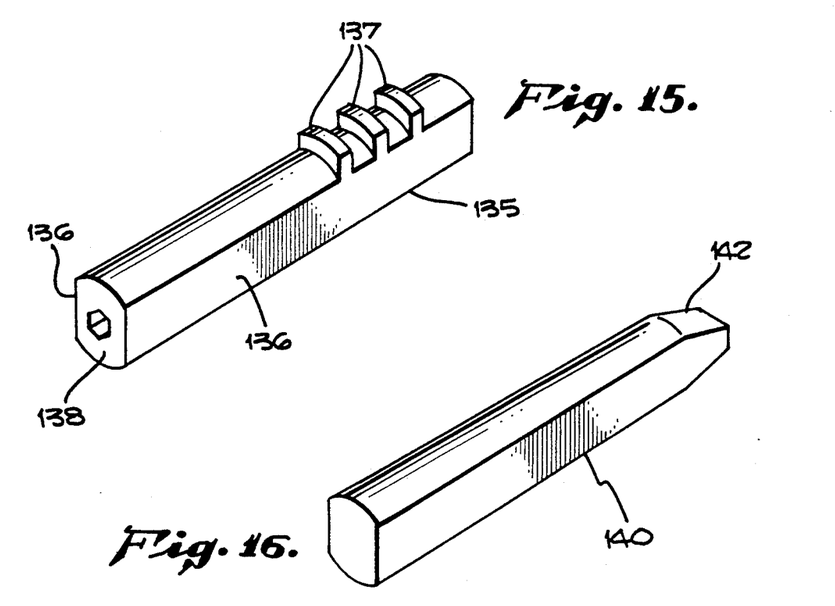
FIG. 15 is a view in perspective of a locking member adapted to be inserted into the aperture and rotated after assembly of the threaded member to a mating part in order to effect locking.
FIG. 16 is a perspective view of a tapered locking member in accordance with this invention.

FIG. 15 illustrates a form of locking member 135 having planar side faces 136 and a plurality of spaced protrusions 137, the one end 138 being provided with an internal hex head. The dimension between the faces 136 is such that when assembled into an aperture, as will be described, the side faces do not extend into the valleys between adjacent crests. The locking member 135 is assembled into an appropriately shaped aperture with the protrusions oriented in a disengaged position, facing away form the threads. After assembly to a mating part, the locking element may be rotated 90 degrees on its axis to cause the protrusions to engage the mating threads to effect frictional locking 180 degrees from the locking member. This form of locking member may be used to reduce the possibility of thread damage to the mating part. It is understood that the protrusions may be configured to match the threads of the mating part in order to achieve locking. Various configurations may be used provided sufficient material is provided in the valleys between adjacent crests to effect the desired locking action.

It is also possible to fabricate a locking element 140, as illustrated in FIG. 16 such that it has a slight taper 142 at the leading end for ease of insertion into the aperture. Other forms of end configurations may be use to ease insertion of the locking member into the aperture. Sleeved locking elements may also be used, i.e., a plastic rod encased in a metal tube.

It will be apparent to those skilled in the art from the foregoing detailed description that various modifications and alterations may be made, as will be recognized from the foregoing description, and that the same are within the scope of the present invention as set forth in the appended claims.

We claim:
1. A fully contained self-locking threaded member carrying a preinstalled locking means and operative upon assembly to a threaded mating member to activate said locking means as the self-locking threaded member and threaded mating member are assembled together to effect self-locking therebetween during assembly, comprising:

a body including a center longitudinal axis and having threads on at least a portion of the surface thereof, said threads including spaced crests with valleys therebetween and flanks extending from the crest to the valley, means forming an aperture extending longitudinally of said body and displaced radially of the center longitudinal axis thereof, said aperture including a center axis and having a dimension such that the aperture extends through the flanks of at least some of the adjacent crests and at least some of the valleys between said crests, said aperture being dimensioned and located such that it extends longitudinally of said body and radially of said crests such that the crests of the threads are continuous, the center axis of said aperture being located radially with respect to the crests and between said crests and said valleys, said locking means being received and retained in said aperture and forming locking segments a portion of which are located radially of said valleys and between adjacent flanks of said threads, and said locking segments being operative upon and during assembly to a threaded mating member to effect self-locking by increasing the frictional contact of the portion of the mating threads located 180 degrees of the location of the locking means as the self-locking threaded member is assembled to a threaded mating member.

2. A self-locking threaded member as set forth in claim 1 wherein said member is threaded externally.

3. A self-locking threaded member as set forth in claim 1 wherein said member is threaded internally.

4. A self-locking threaded member as set forth in claim 2 wherein said member is an externally threaded fastener element.

5. A self-locking threaded member as set forth in claim 3 wherein said member is an internally threaded fastener element.

6. A self-locking threaded member as set forth in any one of the preceding claims 1 through 5 wherein said locking means is a metal member.

7. A self-locking threaded member as set forth in any one of the preceding claims 1 through 5 wherein said locking means is a plastic member.

8. A self-locking threaded member as set forth in any one of the preceding claims 1 through 5 wherein said locking member is a composite member.

9. A self-locking threaded member as set forth in any one of the preceding claims 1 through 5 wherein said locking means is a solid cylindrical member having a predetermined diameter and length, and said aperture being circular in cross-section and of a diameter to form a press fit with said cylindrical member to retain the same axially within said aperture.

10. A self-locking threaded member as set forth in any one of the preceding claims 1 through 5 wherein said locking means is a solid cylindrical member having a predetermined diameter and length, and said aperture being circular in cross-section, and an adhesive material securing said locking means in said aperture.

11. A self-locking threaded member as set forth in claim 1 wherein said locking segments are of symmetrical configuration circumferentially in the region of the valleys between adjacent crests.

12. A self-locking threaded member as set forth in any one of the preceding claims 1-5 and 11 wherein said threaded member includes at least one end face forming the starting threads thereof, said locking means including an end spaced from the starting threads and another end positioned remotely from said starting threads, and said locking means having a length which extends at least across two adjacent crests.

13. A method of forming a fully contained self-locking threaded member from a threaded member wherein said threaded member includes at least one end face and a longitudinal center axis and a plurality of threads including crests and adjacent valleys formed by intersecting thread flanks and wherein said self-locking threaded member carries a preinstalled locking means operative upon assembly to a threaded mating member to activate said locking means as the self-locking threaded member and threaded mating member are assembled together to effect self-locking therebetween during assembly, comprising the steps of:

forming an aperture in said threaded member along the longitudinal axis thereof and which is spaced radially from the center axis thereof, said aperture extending from said end face axially of said member and including portions through at least a portion of some of the flanks of said threads, said aperture being formed radially of said crests such that said crests are continuous, said aperture including a center axis which is located radially with respect to the crests and between said crests and said valleys, providing within said aperture a locking member of a predetermined length at least greater than the axial dimension between at least two adjacent crests of said threads, and positioning said locking member such that the locking member extends through the flanks of at least two adjacent crests to form locking segments to effect self-locking of the member as the self-locking threaded member is assembled to a threaded mating part.

14. The method as set forth in claim 13 wherein said threaded member is threaded externally on at least a portion of the outer surface thereof and includes a root diameter defined by the base of the valleys of the threads.

15. The method as set forth in claim 13 wherein said threaded member is internally threaded on at least a portion of the internal surface thereof and includes a major diameter defined by the base of the valleys of the threads.

16. The method as set forth in claim 15 wherein said aperture is circular in cross-section and includes a center which is radially inwardly of the major diameter of said threads.

17. The method as set forth in any one of claims 13–14 and 15–16 wherein the outside dimension of the locking member is coordinated and correlated with the inside dimension of the aperture to provide a press fit therebetween in order to retain the locking member in the aperture.

18. A fully contained externally threaded self-locking fastener including an end face and threads at least along a portion of the outer surface thereof and carrying a preinstalled locking means operative upon assembly to a threaded mating member to activate said locking means as the externally threaded self-locking fastener and threaded mating member are assembled together to effect self-locking therebetween during assembly, comprising:

a plurality of threads including spaced crests and valleys therebetween formed at the intersection of adjacent flanks, said fastener having a longitudinal center axis and a predetermined major and minor diameter, the major diameter being greater than the minor diameter, means forming an aperture extending axially from said end face a distance sufficient to extend across at least two adjacent crests spaced from the end face thereof, said aperture having a center axis which is positioned radially outwardly of the center axis of said fastener and radially outwardly of the minor diameter such that the aperture passes axially through at least a portion of at least two adjacent flanks and a portion which is radially outwardly of the valley between said adjacent flanks, said aperture being dimensioned and located such that it extends longitudinally of said fastener and radially inwardly of said crests such that the crests of the threads are continuous, said locking means being received within said aperture and including an end face adjacent to but in spaced relation to the end face of said fastener, said locking means being of a predetermined length sufficient to extend axially for at least two adjacent crests thereby forming axially spaced adjacent locking segments for engagement with a mating part, the outer dimension of said locking means being coordinated and correlated with the inner dimension of said aperture to form a press fit therewith to retain said locking element in said aperture, and said locking segments being operative upon and during assembly to a threaded mating member to effect self-locking by increasing the frictional contact of the portion of the mating threads located 180 degrees of the location of the locking means as the externally threaded self-locking fastener is assembled to a threaded mating member.

19. A fastener as set forth in claim 18 wherein said aperture is circular in cross-section and said locking means is proportioned to be received in said aperture and retained therein.

20. A fastener as set forth in claim 19 wherein said locking means is a metal member.

21. A fastener as set forth in claim 19 wherein said locking means is a plastic member.

22. A fully contained internally threaded self-locking fastener including at least one end face and threads at least along a portion of the inner surface thereof and carrying a preinstalled locking means operative upon assembly to a threaded mating member to activate said locking means as the internally threaded self-locking fastener and threaded mating member are assembled together to effect self-locking therebetween during assembly, comprising:

a plurality of threads including spaced crests and valleys therebetween formed at the intersection of adjacent flanks, said fastener having a longitudinal center axis and a predetermined minor diameter corresponding essentially to the diameter of said crests, the minor diameter being less than the diameter of the base of said valleys, means forming an aperture extending axially from said end face a distance sufficient to extend across at least two adjacent crests spaced from the end face, said aperture having a center axis which is spaced radially outwardly of the minor diameter and radially inwardly of the diameter at the base of said valleys such that the aperture passes axially through at least a portion of at least two adjacent flanks and a portion which is radially outwardly of the valley between said adjacent flanks, said aperture being dimensioned and located such that it extends longitudinally of said fastener and radially outwardly of said crests as measured from the central axis such that the crests of the threads are continuous, said locking means being received within said aperture and including an end face adjacent to but in spaced relation to the end face of said fastener, said locking means being of a predetermined length sufficient to extend axially for at least two adjacent crests thereby forming axially spaced adjacent locking segments for engagement with a mating part, the outer dimension of said locking means being coordinated and correlated with the inner dimension of said aperture to form a press fit therewith and to retain said locking means in said aperture, and said locking segments being operative upon and during assembly to a threaded mating member to effect self-locking by increasing the frictional contact of the portion of the mating threads located 180 degrees of the location of the locking means as the internally threaded self-locking fastener is assembled to a threaded mating member.

23. A fastener as set forth in claim 22 wherein said fastener includes spaced end faces and said aperture extends from one end face to the other.

24. A fastener as set forth in claim 22 wherein said aperture is circular in cross-section and said locking means is proportioned to be received in said aperture and retained therein.

25. A fastener as set forth in claim 22 wherein said locking means is a metal member.

26. A fastener as set forth in claim 22 wherein said locking means is a plastic member.

* * * * *